United States Patent [19]

Roberts, Jr. et al.

[11] 3,979,547

[45] Sept. 7, 1976

[54] PAINT FOR USE ON RUBBERS

[75] Inventors: Durward Thomas Roberts, Jr., Akron; Frederick Carl Weissert, Bolivar, both of Ohio

[73] Assignee: The Firestone Tire & Rubber Company, Akron, Ohio

[22] Filed: Mar. 20, 1975

[21] Appl. No.: 560,265

[52] U.S. Cl. ............................. 428/423; 156/116; 260/859 R; 428/425; 428/492; 428/500
[51] Int. Cl.² ..................................... C08L 75/04
[58] Field of Search ........ 260/859; 156/331, 128 U, 156/140 A; 428/423–425

[56] References Cited
UNITED STATES PATENTS

| | | | |
|---|---|---|---|
| 3,361,698 | 1/1968 | Pace | 156/128 U |
| 3,427,366 | 2/1969 | Verdol et al. | 260/859 R |
| 3,428,609 | 2/1969 | Chilvers | 428/423 |
| 3,562,355 | 2/1971 | Holden | 260/859 |
| 3,663,469 | 5/1972 | Weissmahr | 260/859 |
| 3,808,077 | 4/1974 | Rieser | 156/106 |

*Primary Examiner*—George F. Lesmes
*Assistant Examiner*—R. J. Roche

[57] ABSTRACT

When polyurethane paint compositions are applied to natural or synthetic rubbers, as the paint composition dries and cures, the paint may "orange-peel," i.e. it wrinkles or beads without separating from the rubber. It has been found that by adding a small amount of a rubber to such a paint, such orange-peeling is prevented.

7 Claims, No Drawings

PAINT FOR USE ON RUBBERS

PRIOR ART

So far as is known, there has been no suggested solution to the orange peeling of polyurethane paints.

There are polyurethane paints on the market which do not orange peel when painted on rubber. This may be due to the use of certain types of surfactants or some special pigment which is added or may be due to other causes. Just what prevents these polyurethane paints from orange peeling is not known to the applicant.

SUMMARY OF THE INVENTION

There are various reasons for applying polyurethane paints to the surfaces of cured rubbers. The whole purpose may be to cover the rubber with a colored coating. The coating may be merely decorative or the coating may be used for a wide variety of purposes.

Polyurethane paints are advantageously prepared using nonpolar solvents such as the common aromatic solvents including benzene, toluene, xylene, etc. The amount of solvent depends upon the polyurethane prepolymer which is used and may vary from 50 to 500 parts of solvent to 100 parts of prepolymer, more or less. The polyurethanes vary widely in composition. Those to which this invention relates are derived from polyols by reaction with diisocyanates, and paints containing these polyurethanes include diamine curing agents. As the polyurethane cures and the paint dries, the coating orange-peels.

It has been found that if an elastomer is added to the polyurethane coating, when it dries and cures, it does not orangepeel. Without the elastomer, when the polyurethane cures and dries, the solids of the paint agglomerate and the coating beads and produces the orange-peel effect.

The elastomer which may be added is preferably an SBS terpolymer, such as Kraton 1101, but other elastomers may be utilized including natural rubber or the usual synthetic rubbers, including the diene rubbers and the butadiene-styrene copolymers, etc.

Kraton 1101 is a Shell product. It is essentially an SBS copolymer in which the S units are polystyrene of about 15,000 to 20,000 molecular weight and the B units are polybutadiene of about 60,000 to 65,000 molecular weight. The Kraton, because it has styrene blocks, acts as a cured elastomer at room temperature, as is known in the art. Adding the Kraton or other elastomeric rubber to the paint increases the viscosity of the paint after it has been applied to the cured rubber and after the solvent has been removed. This increase in viscosity tends to prevent movement of the solids in the paint and helps to keep the paint from beading together or orange-peeling. The Kraton or other elastomer rubber may also lower the polarity of the dried paint, thereby making the paint more compatible with the rubber. Three to 10 parts of the elastomer, or more preferably 5 to 7 parts, based on 100 parts of the polyurethane prepolymer are added to the paint composition.

The term polyurethane as used herein designates both pure polyurethanes and polyureaurethanes (sometimes called polyurea polyurethanes). A polyurethane is synthesized from a polyol terminated with a diisocyanate, and the reaction product is known as a prepolymer. If the prepolymer is cured with a diol, the following equations are illustrative of what takes place:

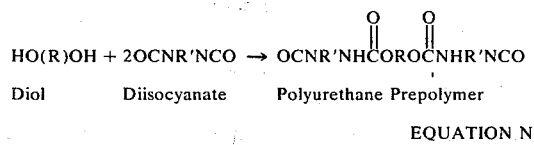

Diol      Diisocyanate      Polyurethane Prepolymer

EQUATION NO. 1

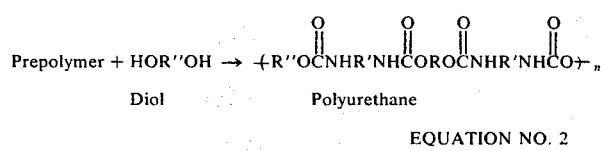

Diol      Polyurethane

EQUATION NO. 2

A polyureaurethane is synthesized from a polyol which has been terminated with a diisocyanate and cured with an amine, such as a diamine or a hydroxylamine. The following equation is illustrative:

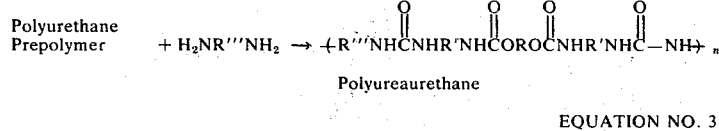

Polyureaurethane

EQUATION NO. 3

The prepolymers to which this invention relates are synthesized from a substantially difunctional hydroxy-terminated diol of appropriate molecular weight which is usually 500 to 10,000 or higher, and may contain trifunctional hydroxy-terminated polyols. The usable polyols include polybutadiene diol, hydrogenated polybutadiene diol, hydrogenated butadienestyrene copolymer diol, polytetrahydrofuran, polypropylene glycol, polyester diols, etc. The polyol is reacted with a diisocyanate, for instance, hydrogenated methylene diphenyl diisocyanate (HMDI), hexamethylene diisocyanate, isophorone diisocyanate or any other diisocyanate which produces an environmental resistant polyurethane. If a discoloring paint is satisfactory, an aromatic diisocyanate may be employed. The reaction of the diol with a diisocyanate to produce the prepolymer is illustrated in the following equation:

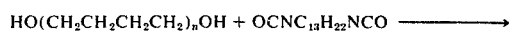

-continued

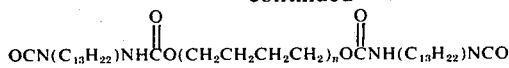

Equation No. 4 in which $C_{13}H_{22}$ is

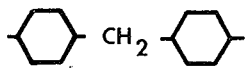

and $n$ is sufficient to give a prepolymer of desired molecular weight.

The reaction takes place on heating the diisocyanate and the diol at 70° to 80° C. for 5 to 24 hours. A catalyst such as dibutyl tin dilaurate (DBTDL) or other catalyst may be used to speed up the reaction.

The curing agents used can be diamines, diols or hydroxyamines. When the amine function is used, the curing agent is preferably aliphatic if discoloration in the colored coating is to be avoided. Examples of curing agents that can be used include: diols — butanediol, ethyleneglycol, pentanediol, hexanediol, cyclohexanediol and various isomers thereof and other diols; hydroxyamines — ethanolamine, propanolamine or other hydroxy amines; and diamines — ethylenediamine, hexamethylenediamine, hydrogenated methylene dianiline, isophorane diamine and other diamines. Usually heating at 100°–140° C. for 60 to 5 minutes produces a desired curing, although the polyurethane may be allowed to cure at room temperature.

The paint advantageously includes an adhesion promoter although the adhesion promoter may be applied to the rubber surface before covering it with the paint. Any adhesion promoter known to the art may be used, including 1-chloro-1-nitropropane, chloro-nitrosated polybutadiene, nitrol, 4-nitroso-4-methyl pentanoic acid, nitrosyl chloride adduct of dicyclopentadiene, 2-chloro-cylohexanone oxime, 1-chloro-1-nitroso cyclohexane and other compounds containing chlorine and nitro, oxime or nitroso groups. Those which are used for surface treatments of a rubber surface include chlorine, bromine, nitrosoyl chloride, hydrogen peroxide, sulfuric acid, hydrochloric acid, hypochlorous acid, ultra violet light and others known to the art.

A preferred promoter is 1-chloro-1-nitro-propane because it is effective without coloring the paint.

The paint may be colored as desired with pigments or dyes, etc.

Various examples illustrating the invention follow:

EXAMPLE 1

General Preparation of the Diisocyanate-Terminated Prepolymers.

The following procedure is illustrative and the invention is not limited thereto.

To a mixture of the diisocyanate and one drop of dibutyl tin dilaurate (DBTDL) in 100 millimeters of dry toluene at 80° C. is added, with stirring, the prepolymer polyol in 100–300 millimeters of dry toluene, over a period of 1 to 2 hours. The mixture is stirred at 80°C. for 6 to 24 hours. After completion, the contents are stored in the absence of air. The following table illustrates that the polyols used, the diisocyanates used and the amount of each used to synthesize the desired prepolymer. The prepolymers are used to make the paints described in Examples 4 and 5.

TABLE 1

DIISOCYANATE-TERMINATED PREPOLYMERS

| Number[1] | Polyol Used[2] | Grams Polyol | Grams $H_{12}MDI$[3] Used |
|---|---|---|---|
| 1 | Adiprene LW 520 made by DuPont - 1700 | — | — |
| 2 | Polymeg 1000 (PolyTHF) | 400 | 157.2 |
| 3 | Niax D737 - 2911 | 291 | 52.4 |
| 4 | Niax D737 - 2911 | 291 | 52.4 |
| 5 | Niax 1025 (polypropylene glycol - PPG) | 205 | 70 |
| 6 | Niax 2025 (PPG) | 202.5 | 47.5 |
| 7 | Niax 3025 (PPG) | 302.5 | 52.4 |
| 8 | Niax 3025 (PPG) | 302.5 | 47.5 |
| 9 | ARCO R45M polybutadiene - 2475 | 247.5 | 52.4 |
| 10 | ARCO R45M - 2475 | 247.5 | 47.5 |
| 11 | 75% hydrogenated ARCO R45M - 2550 | 255 | 55 |
| 12 | 100% hydrogenated ARCO R45M - 2575 | 257.5 | 52.4 |
| 13 | 100% hydrogenated ARCO R45M - 2575 | 257.5 | 47.5 |

[1]Numbers in Tables 1 and 2 correspond.
[2]The four-digit number after the name indicates polyol molecular weight.
[3]$H_{12}MDI$ = hydrogenated methylene diphenyl isocyanate.

The table refers to various products by their trade names and these are interpreted as follows:

Adiprene LW 520 made by duPont de Nemours and Co. is a $H_{12}MDI$ terminated polyTHF.

Polymeg 1000 is a polytetrahydrofuran (THF).

Niax 737 is a polyester with a molecular weight of 2,911.

Niax 1025, 2025 and 3025 are polypropylene glycols (PPG) of molecular weights of 1025, 2025 and 3025.

Arco R45M is polybutadiene diol identified in Sinclair Petrochemicals Inc. (Arco) Product Data Bulletin No. 505 as 100 percent butadiene, having a viscosity of 50 poises at 30° C., an hydroxyl content of 0.80 meq/gm, and an equivalent weight of 1250 and iodine number of 398. The Arco patents (U.S. Pat. Nos. 3,333,018 and 3,673,168 and British Pat. No. 957,788) indicate how the diol may be made.

EXAMPLE 2

Preparation of Hydrogenated Arco Polybutadiene Diol

To a hydrogenation reactor add 100 grams of Arco polybutadiene diol, 1300 grams of hexane and 0.81 grams of nickel hippurate (made from nickel chloride and hippuric acid — $C_6H_5CONHOH_2CO_2H$). The mixture is stirred under a hydrogen atmosphere at 160–170 psi at 90° C. When the hydrogen pressure stops dropping the reaction is complete. A three molar excess of dimethylglyoxime and 50 grams of filter aid are added to the reaction and the mixture is stirred. After stirring, the catalyst and filter aid are filtered off and the hydrogenated Arco is obtained by removing the hexane under vacuum.

EXAMPLE 3

Preparation of Blocked Diamines

The following is illustrative of the preparation of blocked diamines.

3A. Add 42 grams of hydrogenated methylene dianiline (HMDA) and 40 grams of isobutyraldehyde to 100 millimeters of benzene. Reflux the mixture 1 hour or until 7.3 grams of water have been azeotroped off. Strip off the benzene under vacuum, leaving the blocked diamine.

3B. Same procedure as in (3A) above except use 42 grams of methyl isobutyl ketone in place of the aldehyde.

The blocked amines discussed may be used in the preparation of paints.

EXAMPLE 4

Preparation of Paint

4A. The materials listed below were mixed together in a bottle, screened and either sprayed, brushed or rolled onto a clean cured rubber surface and cured at 140° C. for 2–5 minutes.

100 grams of H$_{12}$MDI terminated Arco R45M polybutadiene diol (Table 2, No. 9)
    5 grams of Kraton 1101
    13 grams of isobutyraldehyde blocked HMDA
    15 grams of 1-chloro-1-nitropropane
    300 grams of toluene 4B. The following materials are mixed and applied as illustrated in example (4A) above.

100 grams of cyclohexanone oxime-blocked toluene diisocyanate (TDI)terminated Arco R45M polybutadiene diol
    6.1 grams of methylene dianiline (MDA) in 6.1 grams of THF
    5.0 grams of Kraton 1101
    300 grams of toluene The Arco prepolymer can be made by the following procedure: To a 28 oz. pop bottle is added 247 grams of Arco R45M polybutadiene diol and 34.8 grams of toluene diisocyanate. The contents are heated at 70° C. for four hours with stirring. After completion, 300 ml of THF is added and the contents are dissolved. Then add 22.6 grams of cyclohexanone oxime and reflux overnight. Removal of the THF yields the cylcohexanone oximeblocked TDI terminated Arco polybutadiene diol.

The paint is applied to a rubber surface and cured by heating at 140° C. for 10 minutes.

EXAMPLE 5

Paints That Are Used in Table 2

The following paints which are illustrated in Table 2 are mixed, screened and either sprayed, brushed or rolled onto a cleaned, cured rubber surface. the paints are cured after application to the rubber at 120°–140° C. for 5 to 60 minutes depending upon which prepolymer is used. Table 2 refers to use of the prepolymers described in Table 1. Pigments and/or dyes are added to the paint compositions as desired.

TABLE 2

PREPARATION OF COLORED COATINGS

| Number[1] | Grams Prepolymer | Grams HMDA[2] | Grams Kraton 1101 | Grams 1-chloro-1-nitro-propane | Grams Toluene | Cure Time, Min. | Cure Temp. °C. |
|---|---|---|---|---|---|---|---|
| 1 | 100 | 19.6 | 5 | 15 | 300 | 20–10 | 120–140 |
| 2 | 100 | 18 | 5 | 15 | 200 | 20–10 | 120–140 |
| 3 | 100 | 11.2 | 5 | 15 | 200 | 20–10 | 120–140 |
| 4 | 100 | 9 | 5 | 15 | 300 | 20–10 | 120–140 |
| 5 | 100 | 9 | 5 | 15 | 300 | 30–20 | 120–140 |
| 6 | 100 | 12 | 5 | 15 | 300 | 30–20 | 120–140 |
| 7 | 100 | 11 | 5 | 15 | 200 | 60 | 120 |
| 8 | 100 | 8.6 | 5 | 15 | 300 | 60 | 120 |
| 9 | 100 | 13 | 5 | 15 | 300 | 25–10 | 120–140 |
| 10 | 100 | 11 | 5 | 15 | 300 | 25–10 | 120–140 |
| 11 | 100 | 12 | 5 | 15 | 400 | 20–10 | 120–140 |
| 12 | 100 | 12 | 5 | 15 | 500 | 20–10 | 120–140 |
| 13 | 100 | 11 | 5 | 15 | 500 | 20–5 | 120–140 |

[1]Numbers in Tables 1 and 2 refer to the same compositions.
[2]HMDA = hydrogenated methylene dianilines blocked with isobutyraldehyde.

The Kraton 1101 is added to prevent the coatings from orange-peeling when dried and cured onto a cured rubber surface. The rubber may be any usual natural or synthetic rubber. Adhesion of the paint to the rubber surface is improved by the use of 1-chloro-1-nitro-propane.

We claim:
1. In a cured rubber surface to which is adhered a solid coating of a polyurethane prepolymer derived from a polyol and an isocyanate, which prepolymer is cured with an amine curing agent and contains an adhesion promoter, the improvement in which in the coating, there is 3 to 10 parts of a polystyrene-polybutadiene-polystyrene block copolymer to prevent the coating from orange-peeling.
2. The coated rubber of claim 1 in which the polyurethane is derived from a butadiene diol.
3. The coated rubber of claim 1 in which the polyurethane is derived from a polytetrahydrofuran diol.
4. The coated rubber of claim 1 in which the polyurethane is derived from a polypropylene glycol.
5. The coated rubber of claim 1 in which the polyurethane is prepared from a polyester diol.
6. The coated rubber of claim 1 in which the polyurethane is derived from a hydrogenated polybutadiene or a hydrogenated butadiene-styrene copolymer urethane.
7. The coated rubber of claim 1 in which the rubber surface is the surface of the sidewall of a pneumatic tire.

* * * * *